United States Patent [19]

Koch

[11] Patent Number: 6,071,711
[45] Date of Patent: Jun. 6, 2000

[54] DEGRADATION OF BIODEGRADABLE POLYESTER AMIDES WITH ENZYMES

[75] Inventor: Rainhard Koch, Köln, Germany

[73] Assignee: Bayer AG, Leverkusen, Germany

[21] Appl. No.: 09/180,351

[22] PCT Filed: Apr. 30, 1997

[86] PCT No.: PCT/EP97/02211

§ 371 Date: Nov. 5, 1998

§ 102(e) Date: Nov. 5, 1998

[87] PCT Pub. No.: WO97/43014

PCT Pub. Date: Nov. 26, 1997

[30] Foreign Application Priority Data

May 13, 1996 [DE] Germany ............................ 196 19 236

[51] Int. Cl.$^7$ ................ C12Q 1/34; C12Q 1/44; C12Q 1/37
[52] U.S. Cl. ................ 435/18; 435/19; 435/23; 435/262; 435/832; 435/836; 521/52; 521/77
[58] Field of Search .................. 435/18, 19, 23, 435/262, 832, 836; 521/52, 77

[56] References Cited

FOREIGN PATENT DOCUMENTS 54-119595  9/1979  Japan .

*Primary Examiner*—Nathan M. Nutter

[57] ABSTRACT

A method is disclosed for the enzymatic degradation of polyester amides. The method involves mixing polyester amides with esterase or protease enzymes in aqueous solution.

9 Claims, No Drawings

DEGRADATION OF BIODEGRADABLE POLYESTER AMIDES WITH ENZYMES

This application claims the benefit under 35 USC 371 of prior International Application No. PCT/EP97/02211, filed Apr. 30, 1997.

The invention relates to the complete degradation of moulded bodies, flat-shaped formations or foams consisting of polyester amides by means of enzymes.

Completely biologically degradable and compostable materials are gaining in importance. A great many polymers of this kind have been developed in recent years with the aim of providing a plastics material which can be recycled through composting. Various orders and standards which regulate the admissibility of such materials for composting or can prove that they can be safely composted (e.g. DIN standard 54 900) have at the same time been published. In this connection the term biological degradation always implies that in the presence of microorganisms the materials which are thus described are completely metabolised by the latter to form carbon dioxide and biomass.

It is known that polyester amides can undergo biological degradation (J. Appl. Polym. Sci., 1979, 1701–1711, U.S. Pat. Nos. 4,343,931, 4,529,792, JP 79 119 593, JP 79 119 594). Polyester amides which can be easily produced and are also completely biologically degradable are known from EP-A 641 817.

In the case of some plastics it is known that it is not just the growth of microorganisms on the polymer which proves that they are degradable, but that this can also be detected by means of enzymes. In this connection the test material is incubated with suitable enzymes and the degradation products are analysed (JP 56 022 324, DE-OS 2 632 007, Polymer Degradation and Stability, 1992, 241–248).

It has been found that polyester amides can be degraded by means of enzymes. However the discovered effect goes far beyond an enzymatic degradation to prove a basic biological degradability. It has surprisingly been found that selected enzymes are able to completely hydrolyse polyester amides. In this case the molecular weight of the polymer is reduced to such an extent that products made from it are completely decomposed. The enzymatic degradation takes place without any expensive buffering of the enzyme-containing solution. If, however, pure polyester is incubated with the enzymes which degrade it, the liberation of acid groups causes significant acidification. If the pH value is not maintained constant by buffering or adding lye, degradation soon stops, as most esterases and lipases cease to be active at low pH values.

The present invention provides a method for the enzymatic degradation of polyester amides, wherein the polyester amides are mixed with enzymes selected from the esterase, lipase and protease group in an aqueous solution, which may be buffered.

All enzymes which can break the ester and amide bonds in the polymer may basically be used to degrade the polyester amides.

The degradation takes place in an aqueous solution, which may be buffered. The pH value may lie between 3 and 11, preferably between 5 and 9, with a value between 7 and 8 being particularly preferred.

The following buffers, for example, may be used according to the invention: citrate, acetate, phosphate, formate, carbonate, trishydroxymethylamino methane, triethanolamine, imidazole, oxalate, tartrate, fumarate, maleinate, phthalate, succinate, ethylenediamine and mixtures of a plurality of these. Acetate, phosphate and citrate are preferably used as buffers.

The temperature at which the enzymatic degradation takes place may lie between 10 and 90° C., preferably between 20 and 70° C., with a temperature between 30 and 50° C. being particularly preferred.

The method may be carried out in different ways:

The polymer is added to the aqueous enzyme-containing solution. The biologically degradable polymer may be added as a film, a sheet or in granular form. Moulded bodies may be added as a whole or comminuted. Coated or glued materials or materials in the case of which coatings have been applied or adhesive joints produced with polymers, such as, e.g. paper or board and coated paper or board, may be added to the enzyme-containing solution as a whole or in comminuted form.

The aqueous enzyme-containing solution may also be applied by spraying it onto the coating or the moulded body which is to be degraded.

The enzymes which are used may be lipases, esterases or proteases. The proteases preferably come from bacteria of the Bacillus genus, with proteases of the *Bacillus alcalophilus* and *Bacillus licheniformis* organisms being particularly suitable. These proteases are generally accessible and commercially available (cf. Examples).

Suitable microorganisms for producing the enzymes which are suitable according to the invention can be isolated according to conventional microbiological methods, e.g. through culturing in conventional nutritive media and examining the degradation activity. The enzymes are also isolated and purified according to conventional methods (Manual of Methods for General Bacteriology, ASM, Washington 1981).

The polyester amides which are used preferably have ester contents of between 35 and 70%, in particular 35 to 60 wt. %, comprising aliphatic dialcohols with a chain length of $C_2$–$C_{12}$, preferably $C_2$–$C_6$, aliphatic dicarboxylic acids or the esters thereof with a chain length of $C_2$–$C_{12}$, preferably $C_2$–$C_6$, amino carboxylic acids or the esters thereof with a chain length of $C_1$–$C_{12}$, preferably $C_4$–$C_6$, or cyclic lactams with a ring size of $C_5$ to $C_{12}$, preferably $C_6$–$C_{11}$, or a 1:1 salt of aliphatic dicarboxylic acid and aliphatic diamine with a chain length of $C_4$–$C_{12}$, preferably $C_4$–$C_6$, optionally with 0.01 to 5 wt. %, preferably 0.001 to 2 wt. %, of branching agent. They have a melting point of above 75° C. and an average molecular weight MW>30 000.

The monomers may come from the following groups dialcohols such as ethylene glycol, 1,4-butanediol, 1,3-propanediol, 1,6-hexanediol, diethylene glycol, inter alia, and/or dicarboxylic acid such as oxalic acid, succinic acid, adipic acid, inter alia, also in the form of their respective esters (methyl-, ethyl-, etc.) and/or hydroxycarboxylic acids and lactones such as caprolactone, inter alia, and/or amino alcohols such as ethanolamine, propanolamine, etc. and/or cyclic lactams such as ε-caprolactam or lauryl lactam, etc. and/or ω-amino carboxylic acids such as amino caproic acid, etc. and/or mixtures (1:1 salts) of dicarboxylic acids such as adipic acid, succinic acid, etc. and diamines such as hexamethylene diamine, diaminobutane, etc.

It is equally possible to use either hydroxyl- or acid-terminated polyesters with molecular weights of between 300 and 10 000 as the ester-forming component.

The polyester amides preferably have caprolactam as the cyclic lactam and 1,4-butanediol and adipic acid as the ester-forming components.

The polyester amides may be produced from the 1:1 salt of aliphatic dicarboxylic acid and aliphatic diamine, preferably the "AH salt" of adipic acid and 1,6-hexamethylene diamine.

Preferred polyester amides comprise 6-aminohexanoic acid as the amino carboxylic acid structural unit.

The polyester amides can be synthesised both according to the "polyamide method" by mixing the base components in a stoichiometric ratio, with water optionally being added and subsequently removed from the reaction mixture, and according to the "polyester method" by adding an excess of diol with esterification of the acid groups and subsequent transesterification or transamidation of these esters. In this second case the excess of glycol is also distilled off again in addition to water.

The polyester amides according to the invention may also comprise 0.1 to 5 wt. %, preferably 0.1 to 1 wt. % of branching agents. These branching agents may be, e.g. trifunctional alcohols such as trimethylolpropane or glycerol, tetrafunctional alcohols such as pentaerythritol or trifunctional carboxylic acids such as citric acid.

The polyester amides according to the invention may optionally be provided with conventional additives such as, for example, plasticizers, impact strength modifiers, flame retardants, water repelling agents, nucleating agents and/or other agents. The thermoplastically processible polyester amides according to the invention may be charged with conventional fillers, either alone or mixed with the above-mentioned additives.

The following are uses according to the invention of the combination of polyester amides or materials containing polyester amides (=PEA) with the enzymes which degrade them:

The inclusion of chemicals, active ingredients, auxiliary substances, enzymes, microorganisms in PEA and the specific liberation thereof by adding enzymes The use of PEA as an adhesive or bonding agent for producing composites or moulded parts from non-mouldable materials with the object of decomposing these again by adding suitable enzymes The use of moulded bodies, flat-shaped formations or foams with the object of degrading these through a pre-treatment with enzymes to an extent such that after being utilised as waste they can be disposed of via a purification plant, or the volume of the waste is reduced The production of moulded bodies or flat-shaped formations which can specifically be rendered porous by adding suitable enzymes The production of fibres, woven cloths, textiles from PEA which can be decomposed through the use of enzymes or reduced in volume The use of enzymes to degrade PEA with the object of producing aqueous dispersions from the latter The selective removal of coatings, coverings and wrappings consisting of PEA by means of enzymes The production of oligomers from PEA by means of enzymes The production of PEA packings of all types with the object of treating the packaged items and liberating them again following the treatment by adding enzymes The decomposition of hygiene bags (ostomy bags) for artificial anuses by means of enzymes

EXAMPLES

Example 1

200 ml of buffer (50 mM potassium phosphate, pH 8.0, 0.02% sodium azide) were added to 0.3 g of a thin blown film. Various quantities of enzymes were then added. The test specimens were incubated for 20 hours at 37° C. while being shaken at 220 rpm. Following incubation the solutions were passed through a filter (pore size 2×2 mm) and the liquid running through was sucked off via a suction bottle. The residue in the filter was dried at 90° C. and then weighed. The degradation of the film was determined through the weight loss.

TABLE 1

Degradation of polyester amide films by means of enzymes

| Preparation | Organism | Enzyme quantity (v/v) | pH after incub. | wt. loss (%) |
|---|---|---|---|---|
| Film + buffer without enzyme | | 0 | 7.93 | 2 |
| Film + buffer + Opticlean | Bac. alcalophilus[1] | 1% | 7.64 | 53 |
| Film + buffer + Opticlean | Bac. alcalophilus[1] | 5% | 7.59 | 55 |
| Film + buffer + protease | Bac. licheniformis[1] | 1% | 7.51 | 71 |
| Film + buffer + protease | Bac. licheniformis[1] | 5% | 7.35 | 91 |
| Film + buffer + esperase | Bacillus spec.[2] | 1% | 7.66 | 47 |
| Film + buffer + esperase | Bacillus spec.[2] | 5% | 7.65 | 34 |
| Film + buffer + alcalase | Bac. licheniformis[2] | 1% | 7.53 | 75 |
| Film + buffer + alcalase | Bac. licheniformis[2] | 5% | 7.35 | 89 |

[1] Commercial product of the firm Solvay, Germany
[2] Commercial product of the firm Novo Nordisk, Denmark As shown by the above table, practically complete degradation of the film was achieved.

What is claimed is:

1. A method for the enzymatic degradation of polyester amides, which comprises mixing the polyester amides with enzymes selected from the group consisting of esterase and protease enzymes in aqueous solution.

2. The method of claim 1, wherein the aqueous solution is buffered.

3. The method of claim 1, wherein the pH of the aqueous solution is between 8 and 10.

4. The method of claim 1, wherein the enzyme is at least one protease from the genus Bacillus.

5. The method of claim 2, wherein the enzyme is at least one protease from the genus Bacillus.

6. The method of claim 3, wherein the enzyme is at least one protease from the genus Bacillus.

7. The method of claim 4, wherein the Bacillus is *Bacillus alcalophilus* or *Bacillus licheniformis*.

8. The method of claim 1, wherein the polyester amides are composed of aliphatic $C_2$–$C_{12}$ alcohols, $C_2$–$C_{12}$ aliphatic dicarboxylic acids and/or $C_1$–$C_{12}$ carboxylic acids and/or cyclic lactams with a ring size of $C_5$–$C_{12}$ or a 1:1 salt of aliphatic $C_4$–$C_{12}$ dicarboxylic acid and aliphatic $C_4$–$C_6$ diamine.

9. The method of claim 1, wherein a reaction mass is formed, and wherein the ester content is between 35 and 70 weight percent of the reaction mass.

* * * * *